May 2, 1933.  W. F. NEWHOUSE  1,907,362
BUSHEL BASKET MACHINE
Filed Jan. 31, 1931    10 Sheets-Sheet 2
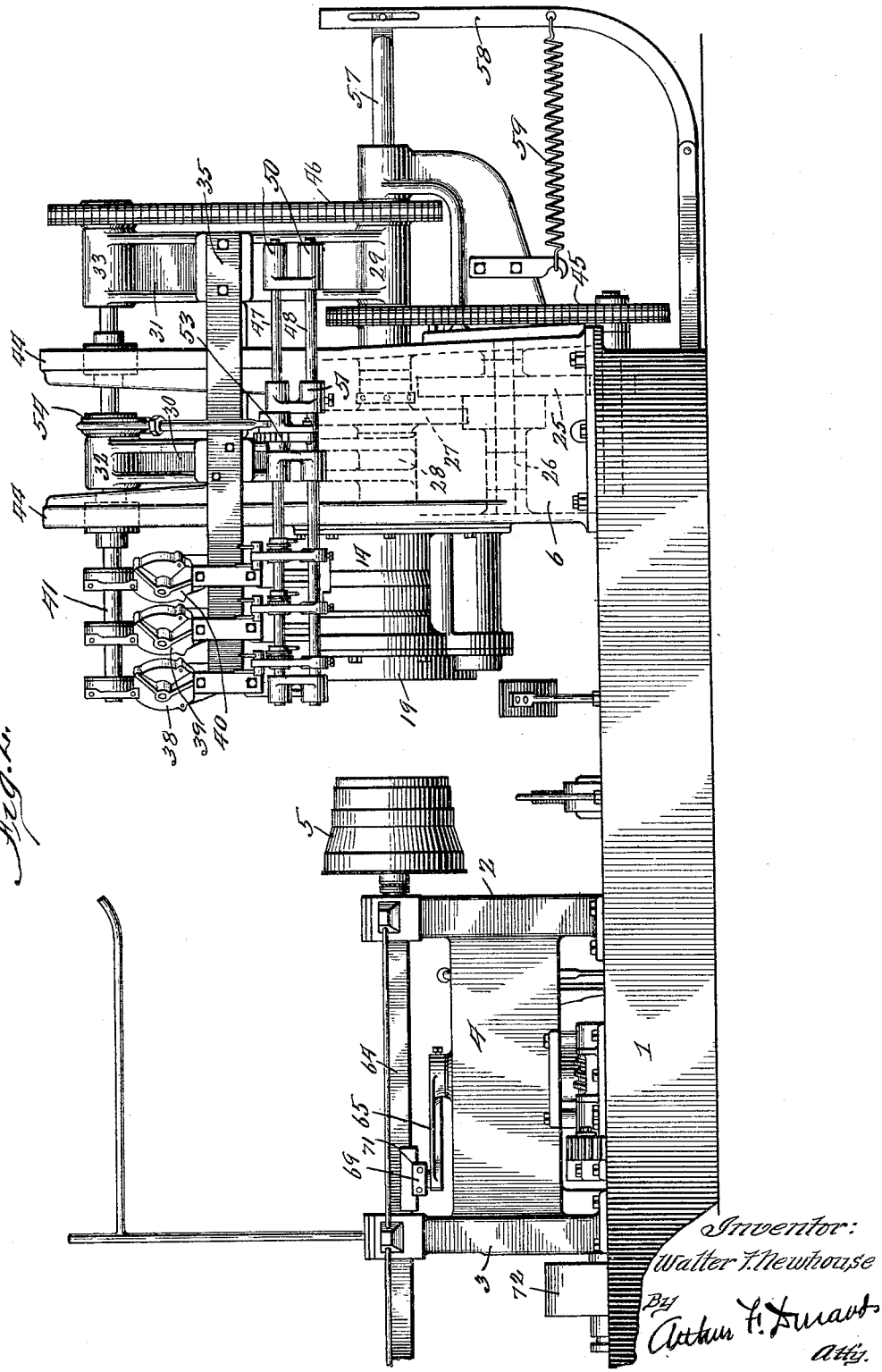

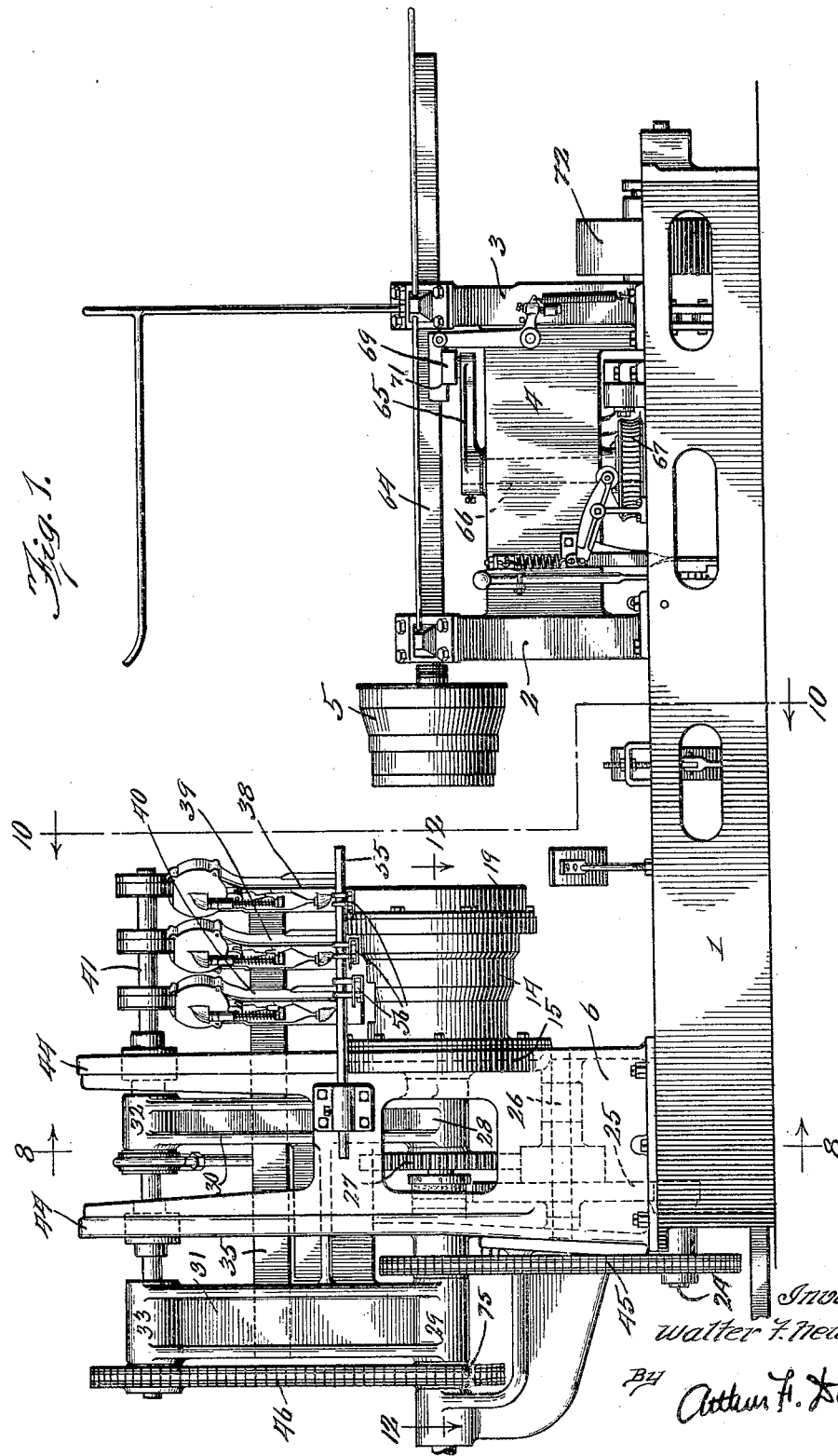

May 2, 1933.  W. F. NEWHOUSE  1,907,362
BUSHEL BASKET MACHINE
Filed Jan. 31, 1931  10 Sheets-Sheet 3
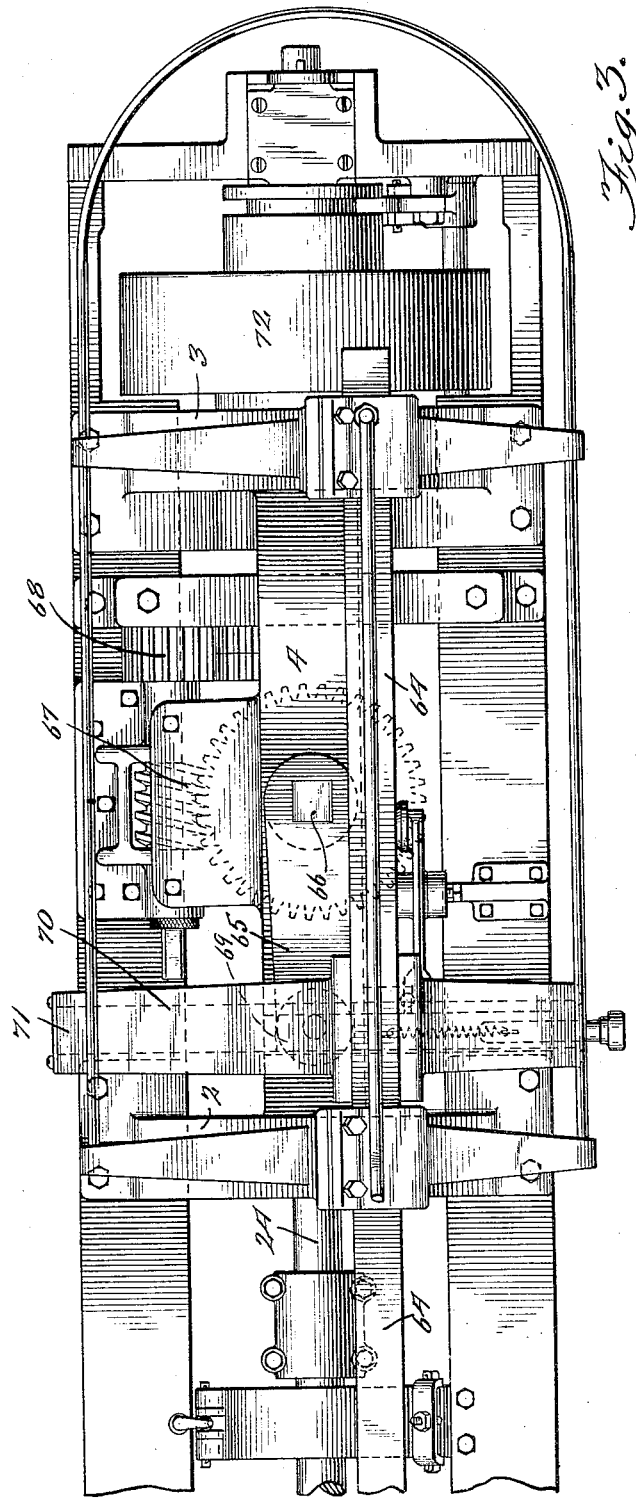
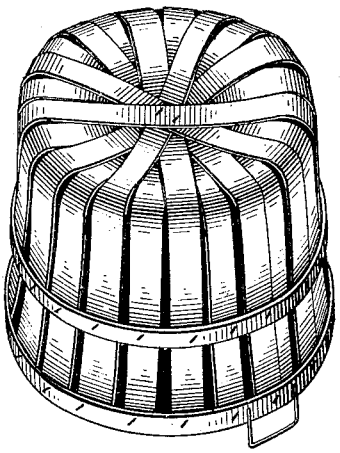
Inventor:
Walter F. Newhouse
By Arthur F. Durand
Atty.

May 2, 1933. W. F. NEWHOUSE 1,907,362
BUSHEL BASKET MACHINE
Filed Jan. 31, 1931 10 Sheets-Sheet 4
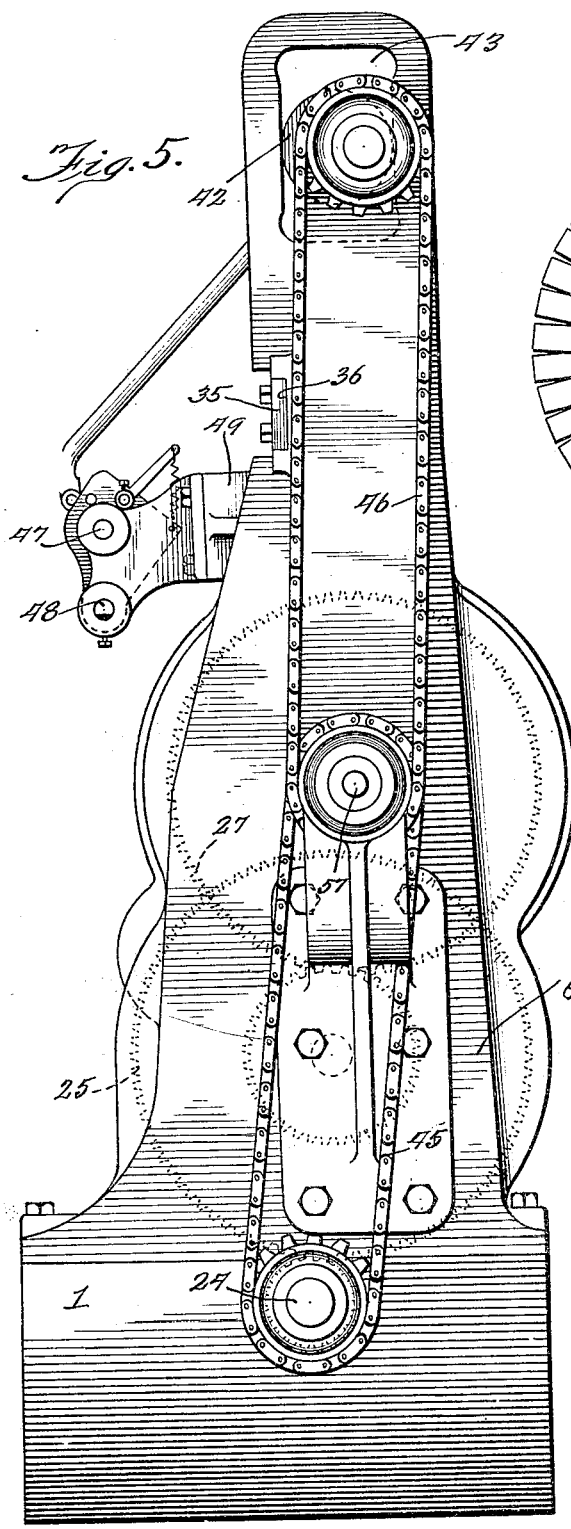
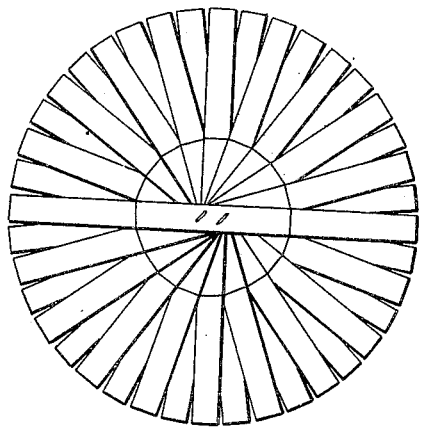
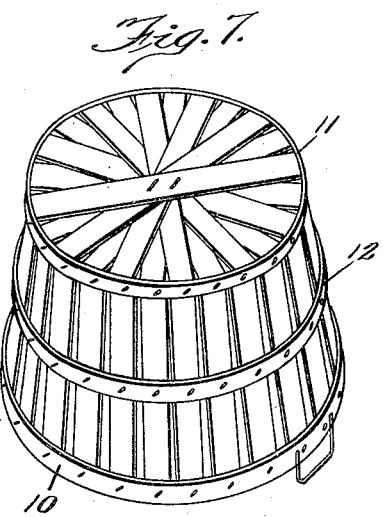
Inventor:
Walter F. Newhouse
By Arthur H. Amard
Atty.

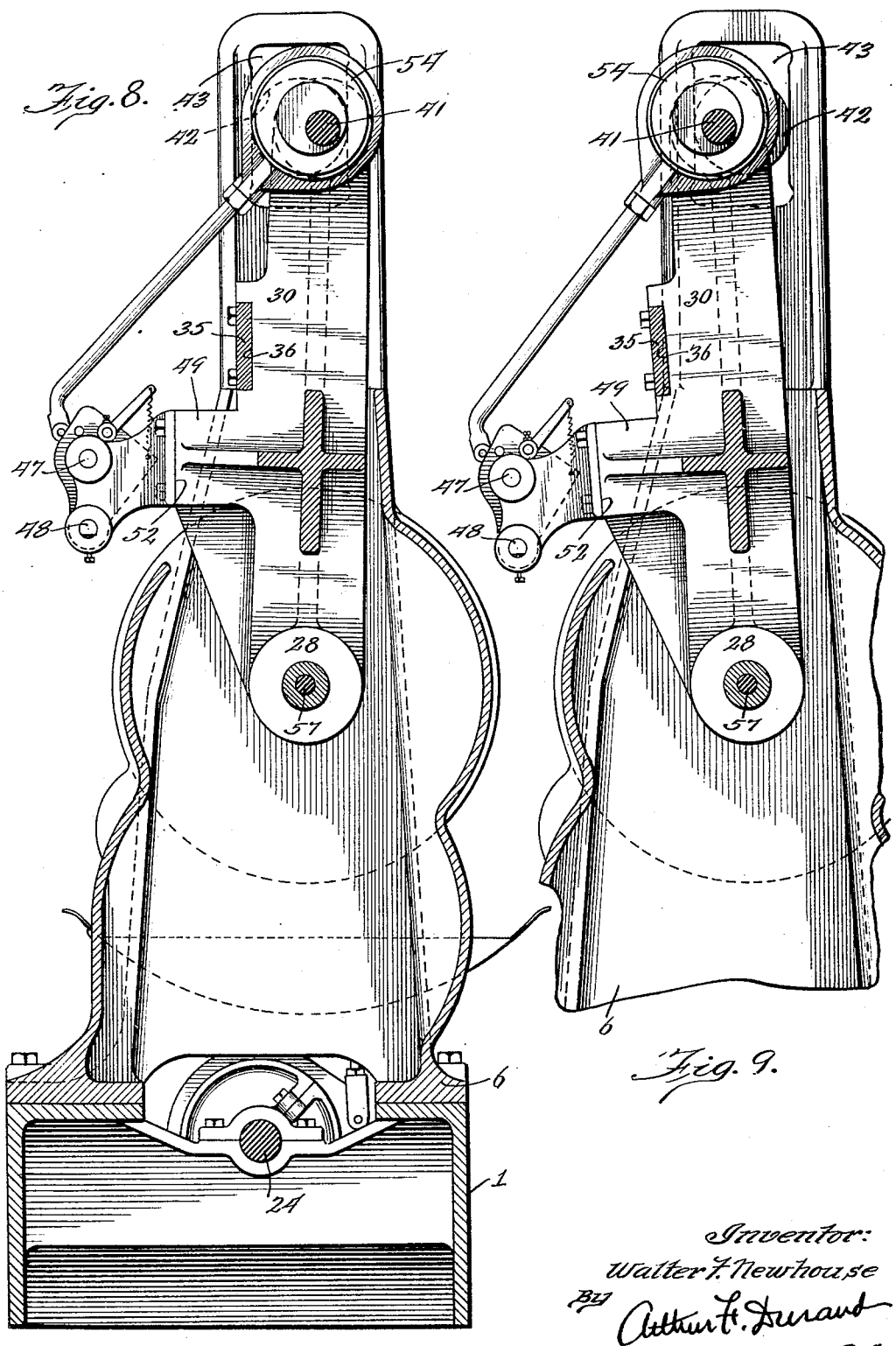

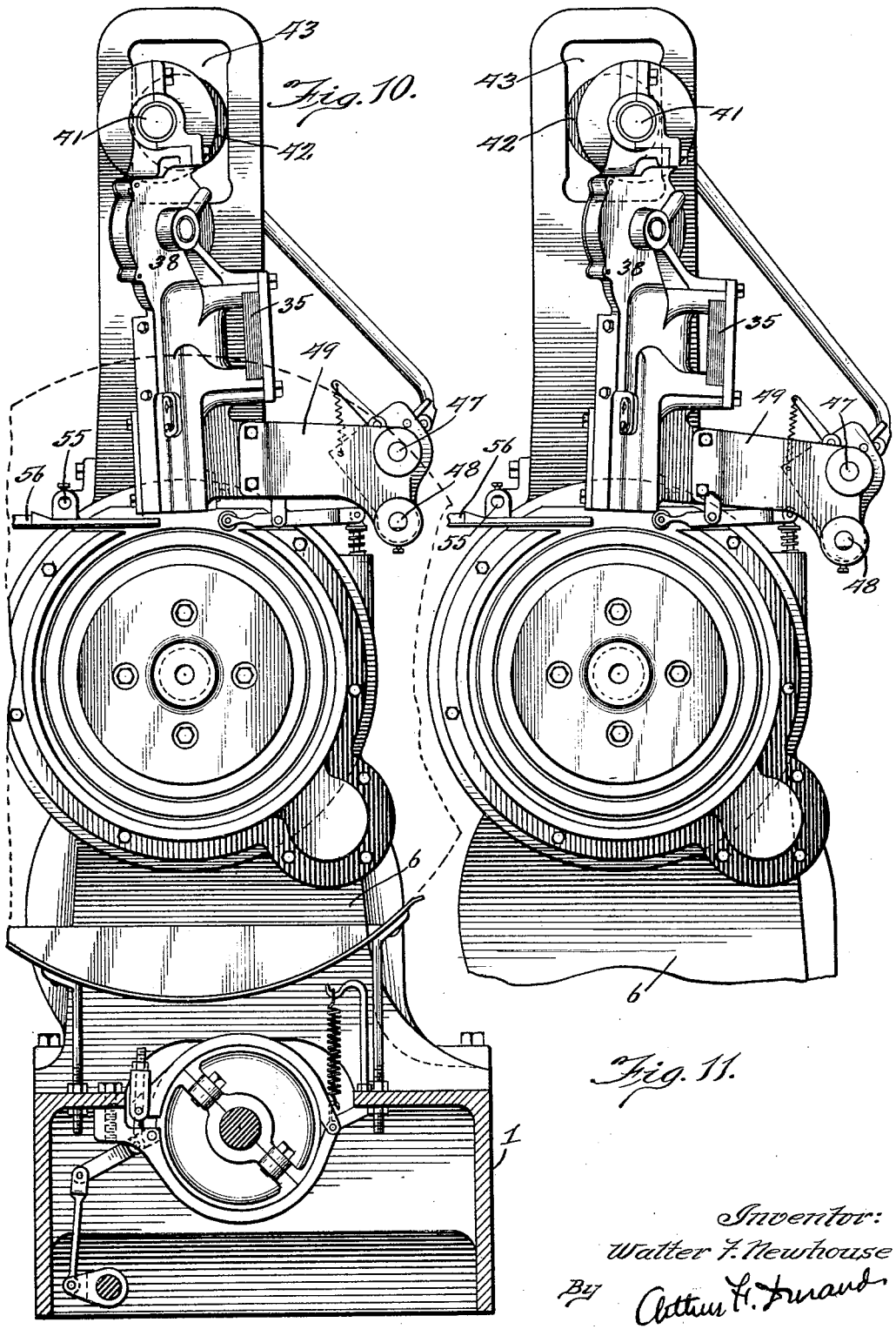

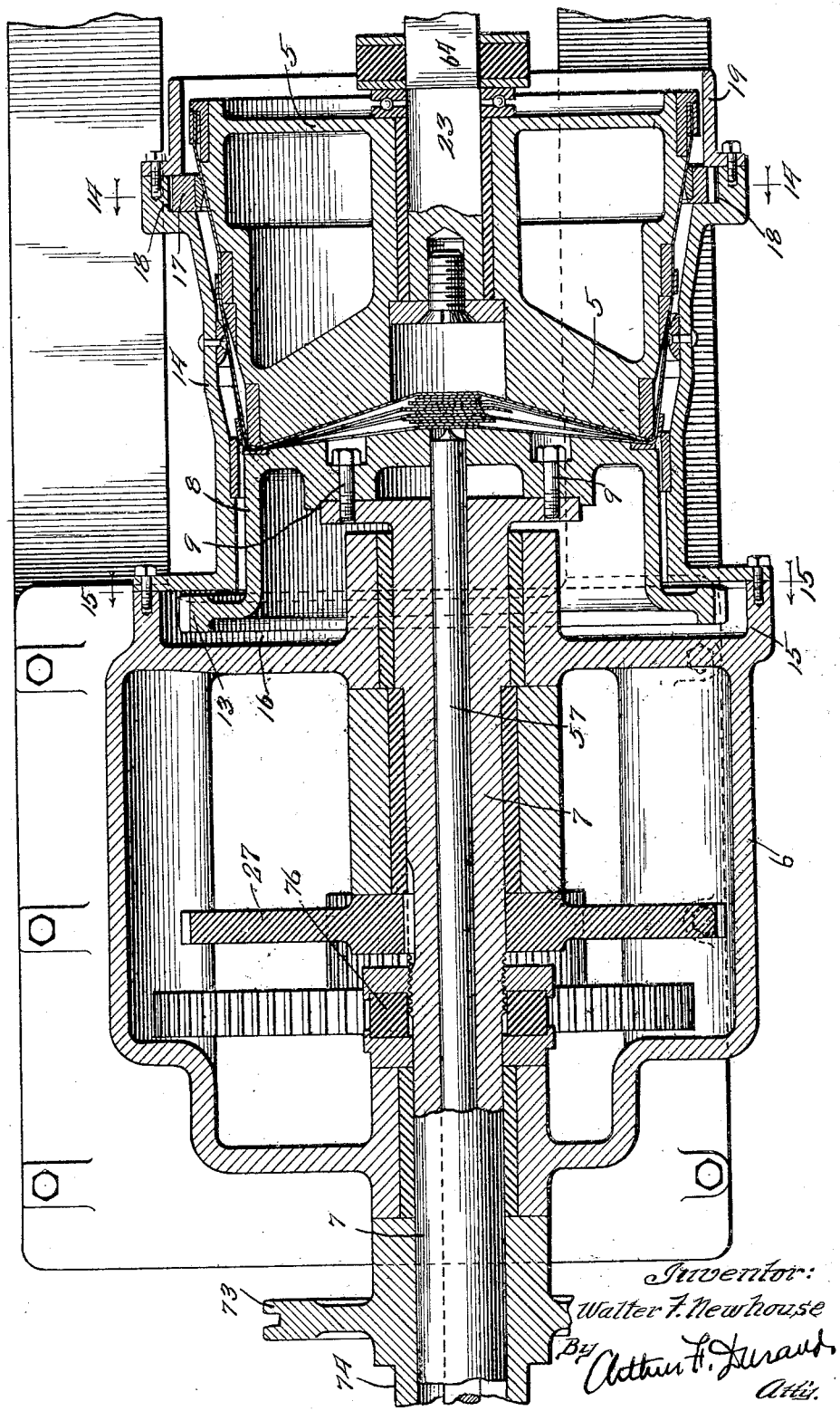

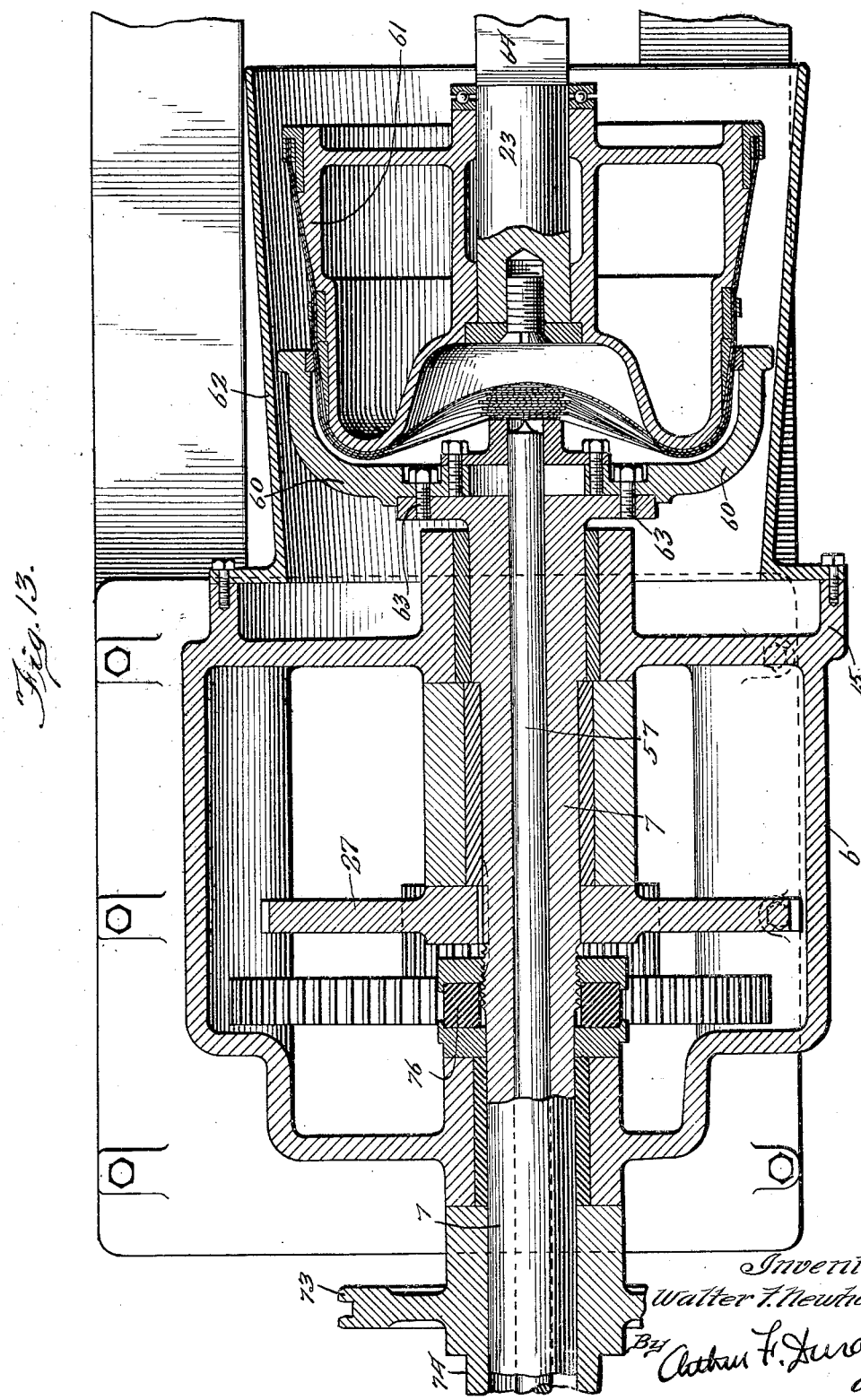

May 2, 1933.  W. F. NEWHOUSE  1,907,362
BUSHEL BASKET MACHINE
Filed Jan. 31, 1931   10 Sheets-Sheet 9

Inventor:
Walter F. Newhouse
By Arthur F. Durant
Atty

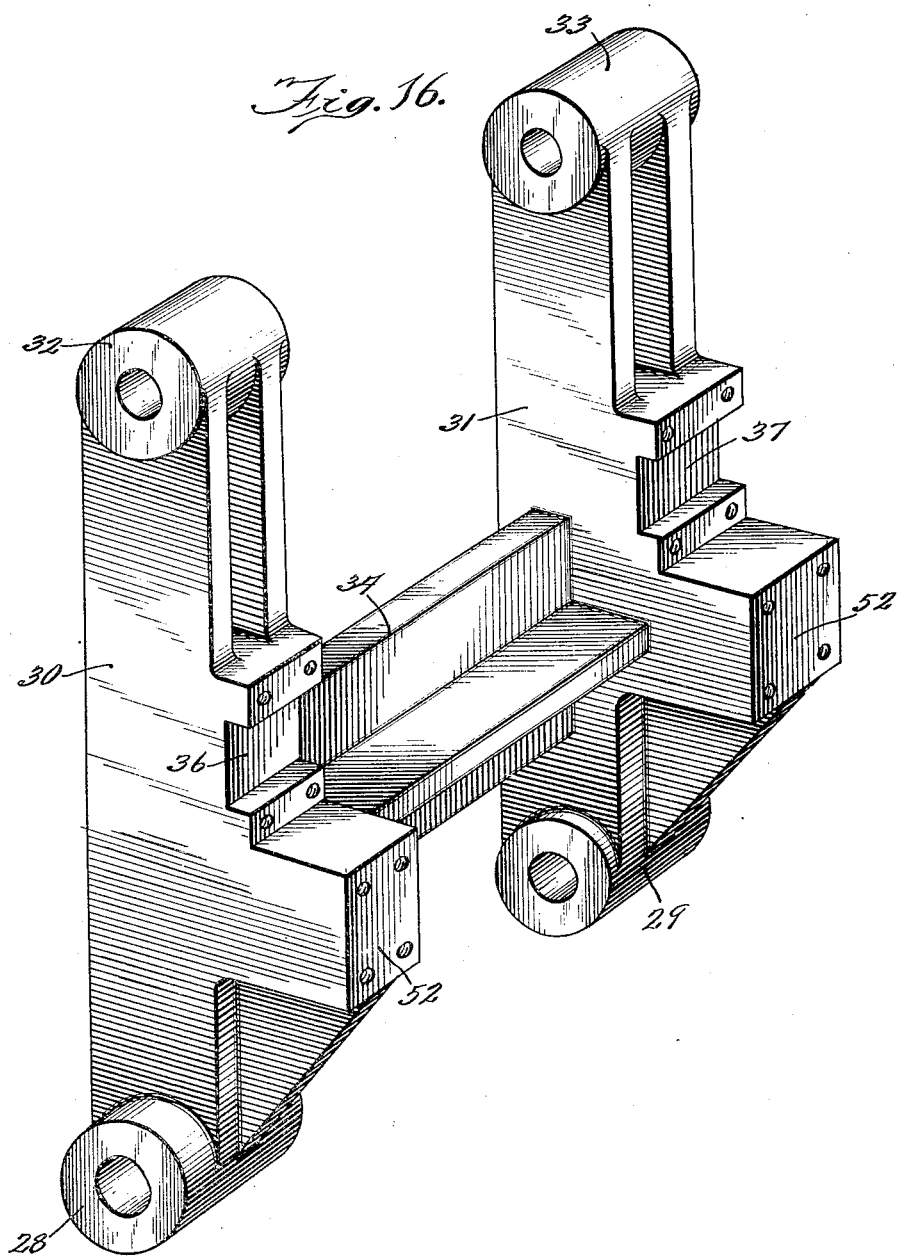

Patented May 2, 1933

1,907,362

UNITED STATES PATENT OFFICE

WALTER F. NEWHOUSE, OF BENTON HARBOR, MICHIGAN

BUSHEL BASKET MACHINE

Application filed January 31, 1931. Serial No. 512,648.

This invention relates to machinery for making baskets, and more particularly to machines of this kind in which the basket or other receptacle and the stapling mechanism for inserting staples to secure the various parts together, are mounted for relative rotation about an axis extending centrally and longitudinally of the basket or other receptacle.

Generally stated, the object of the invention is to provide a novel and improved construction and arrangement whereby the stapling mechanism is adapted to move a distance with the basket materials, or materials for the desired receptacle or container, during the insertion of each staple, whereby the relative rotation may be continuous, as by having the basket or other receptacle rotated continuously, instead of intermittently, thereby to accelerate the stapling operations and increase the speed of production, and to obtain other advantages, as will hereinafter more fully appear.

It is also an object to provide certain details and features of construction and combinations tending to increase the general efficiency and the desirability of a basket or receptacle machine of this particular character, and more particularly one in which the stapling mechanism is oscillatory about the axis of the basket or other receptacle.

To the foregoing and other useful ends, the invention consists in the matters hereinafter set forth and claimed, and shown in the accompanying drawings, in which,—

Fig. 1 is a side elevation of a basket or receptacle machine embodying the principles of the invention.

Fig. 2 is a similar view of the other side of said machine.

Fig. 3 is a plan view of a portion of said machine, on a larger scale.

Fig. 4 is a perspective of one of the baskets that may be made on said machine, by using two staplers to staple only two outside hoops to the basket.

Fig. 5 is an end elevation of said machine, on a larger scale.

Fig. 6 shows a preliminary mat or blank from which baskets may be made, of one kind, on the machine shown in the drawings.

Fig. 7 is a perspective of a basket made from the mat shown in Fig. 6 of the drawings.

Fig. 8 is a vertical section on line 8—8 in Fig. 1, on a larger scale, showing the parts in certain positions.

Fig. 9 is a similar view, showing the parts in different positions.

Fig. 10 is a vertical section on line 10—10 in Fig. 1 of the drawings, on a larger scale, showing the parts in certain positions.

Fig. 11 is a similar view, showing the parts in different positions.

Fig. 12 is a horizontal section on line 12—12 in Fig. 1 of the drawings, on a larger scale, but showing the basket form moved into the mold of the machine, with basket materials between them.

Fig. 13 is a similar view, showing a differently shaped form and mold, which can be used on said machine, for making the basket shown in Fig. 4 of the drawings.

Fig. 16 is a perspective of the oscillatory frame or support upon which the stapling mechanism is mounted to oscillate about the axis of the basket or other receptacle.

Figure 14:
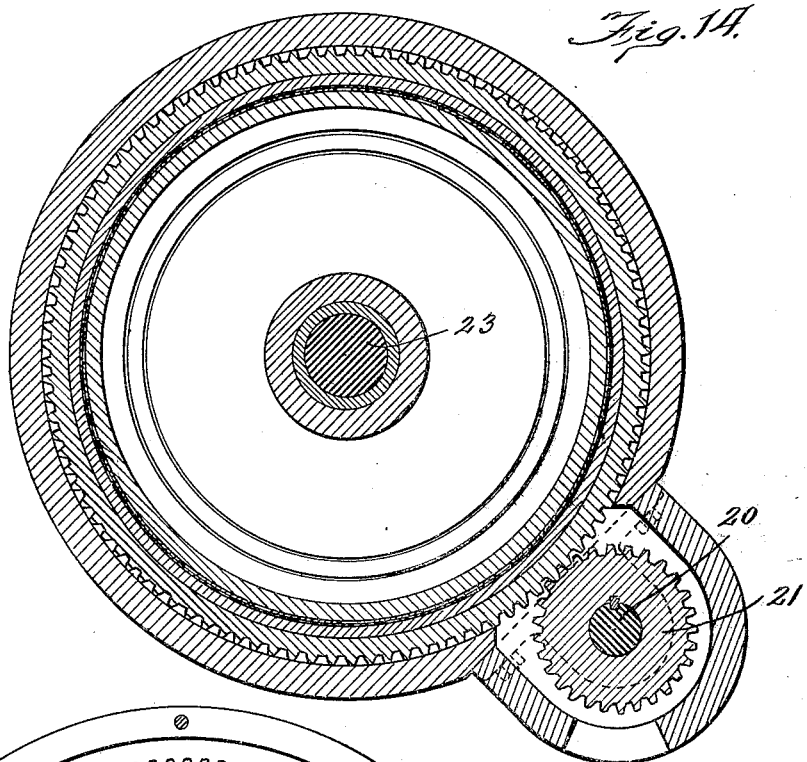
Fig. 14 is a transverse vertical section on line 14—14 in Fig. 12 of the drawings.
Figure 15:
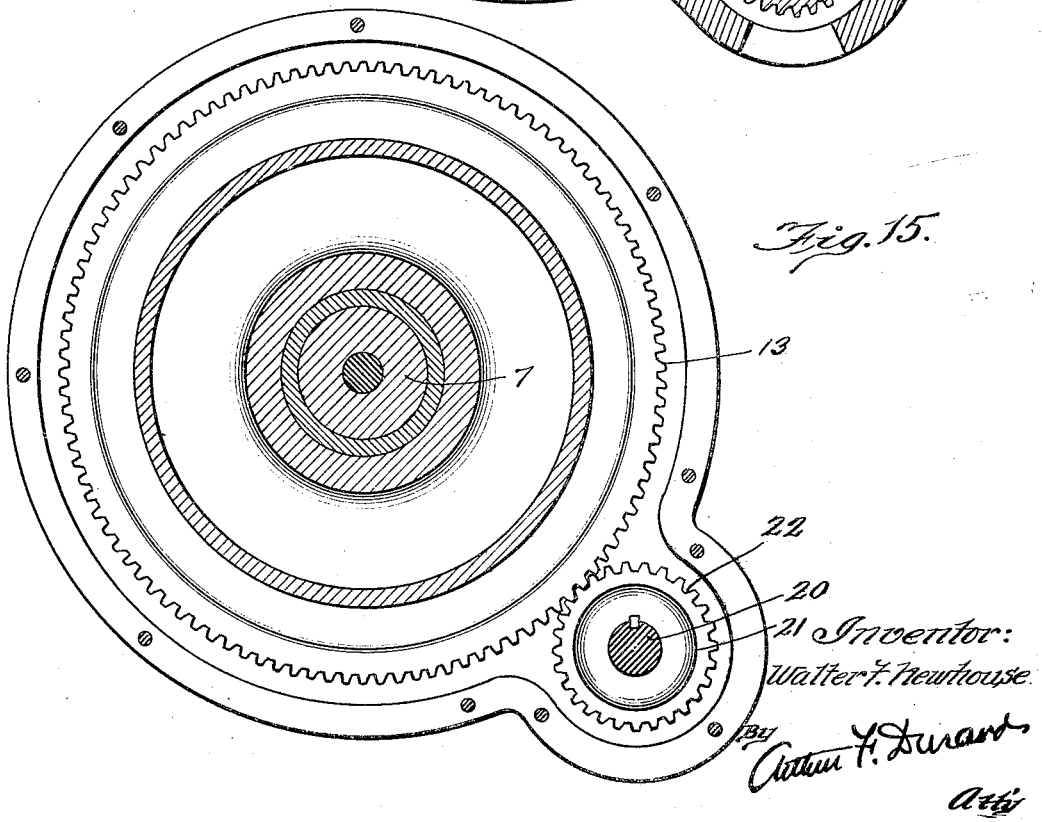
Fig. 15 is a similar view on line 15—15 in Fig. 12 of the drawings.

Referring to Figs. 1 and 2 of the drawings, it will be seen that the invention comprises a bed frame or base 1 upon which are mounted the upright castings 2 and 3, the latter being preferably connected by the frame construction 4, which latter may be integral with the said upright castings or end frames 2 and 3, shown in the drawings. The basket form 5 is suitably mounted upon the frames or castings 2 and 3, in position to rotate about a horizontal and longitudinal axis, and in such manner that it is adapted to reciprocate axially, to form and release the baskets, as will hereinafter more fully appear.

At the other end of the bed 1, there is an upright casting 6 having bearings for the longitudinal and horizontal shaft 7, which latter is hollow and detachably connected to the basket-bottom forming member 8, shown in Fig. 12 of the drawings, by bolts 9, this member 8 being adapted to press the bottom of the basket, shown in Fig. 7, against the end of the basket form 5, shown in Fig. 12 of the drawings. This makes a so-called straight-side basket, having straight downwardly tapered sides provided with top and bottom outside hoops 10 and 11, and a middle hoop 12, of the kind shown in Fig. 7 of the drawings. The member 8 is provided with a gear 13, and the outside housing or mold 14 forms, with the portion 15 of the casting 6, a recess or space 16 in which the said gear rotates. A gear ring 17 is formed to engage the basket near the upper hoop thereof, and is adapted to rotate in a recess 18 formed between the housing 14 and its removable end portion 19, this ring 17 being adapted to grip the sides of the basket immediately below the upper hoop thereof, or between the upper outside hoop and the aforementioned middle hoop of the basket. A shaft 20 is provided with a pinion 21 for engagement with the gear ring 17, and is provided with a pinion 22 for engagement with the gear 13, whereby the latter drives the ring 17, resulting in a gripping of the basket at the bottom thereof and at points on the sides thereof, thereby rotating the form 5 with the basket, on the end of the spindle 23 provided to support the said form 5, which spindle is suitably supported by the frame or casting 2, and by other parts, as will hereinafter more fully appear. A drive shaft 24 is provided, of any suitable character, mounted longitudinally in the bed 1, and is provided with gear connection 25 with the countershaft 26, which latter in turn has gear connection 27 with the shaft 7 previously mentioned. In this way, the shaft 7 and the member 8 and the gear ring 17 are rotated continuously, instead of intermittently, during the process of forming and stapling a basket, although the rotation may stop between baskets, for the release of the finished basket, and for the insertion of another web for the next basket.

As shown in Figs. 1 and 2, an oscillatory member, of the kind shown in Fig. 16 of the drawings, is provided with lower portions 28 and 29 which oscillate about the axis of the shaft 7, upright portions 30 and 31, integral with said portions 28 and 29, and upper bearing portions 32 and 33, as shown, and it will also be seen that the two upright portions 30 and 31 are integrally connected together by the horizontal bar 34, which latter is adapted to rigidly connect the upright frame members, whereby the whole forms one rigid oscillatory frame, which is oscillatory about the axis of the basket or other receptacle. A bar 35 is rigidly clamped in recesses 36 and 37 formed on the member shown in Fig. 16, and upon this bar the staplers 38, 39 and 40 are mounted for adjustment toward and away from each other, in position to insert staples through the hoops 10, 11 and 12 of the basket, and through the sides of the basket, so that the staples are clinched on the outer sides of the basket form 5 previously described. A shaft 41 is mounted in the bearings 32 and 33, as shown, and this shaft is provided with eccentric disks or cams 42 that rotate in the recesses or circumscribed openings 43 in the uprights 44 of the casting 6 previously mentioned. Therefore, rotation of the shaft 41 will cause the staplers and the member shown in Fig. 16 to oscillate about the horizontal and longitudinal axis of the basket or other receptacle. For this purpose, the shaft 24 is connected by suitable power connections, including the sprocket chains 45 and 46, with the shaft 41, whereby the latter is continuously rotated during the operation of stapling each basket, the basket or other receptacle rotating without interruption until all of the staples are driven.

Feed roll shafts 47 and 48 are mounted in bracket bearings 49 suitably bolted to the bodies of the aforementioned staplers, as well as in bearings 50 and 51, said bearings 50 and 51 being suitably bolted to the projections 52 on the member shown in Fig. 16 of the drawings. It will be understood that these feed roll shafts have feed rolls (not shown) of any suitable character for feeding the wire to the staplers, from which wire the staplers are formed. The upper feed roll shaft 47 is actuated by a ratchet device 53, which latter in turn is actuated by an eccentric device 54 on the shaft 41 previously mentioned. The cams or eccentric disks 42, it will be seen, in combination with the circumscribed cam openings 43, cause the shaft 41 to move laterally and horizontally, thus causing the aforementioned and necessary or desirable oscillation of the staplers and their support about the horizontal and longitudinal axis of the basket during the rotation of the latter to receive the staples. In this way, each staple is driven while the stapler and the basket materials are moving in unison, and the stapler then swings backward to receive the next staple in the same way. Consequently, the basket or other receptacle has a continuous rotation, instead of a jerky or intermittent feeding rotation, during the complete operation of stapling an entire basket.

As shown, a rod 55 is rigidly mounted on the casting 6, in horizontal position, parallel with the axis of the basket, and upon this rod are mounted the hoop strip guides 56, one for each stapler, whereby the outside hoops of the basket are fed in strip form to the outer surface of the basket walls, and gradually coiled or bent around the basket side walls in a manner that will be readily understood, and progressively or gradually fastened in place by the staples which are driven successively along each hoop strip as it bends around the basket.

When the basket is finished, and the basket form 5 is retracted, by any suitable mechanism, the knock-out or ejector rod 57, shown more clearly in Fig. 12, is actuated endwise by the lever 58 and the spring 59, to eject the finished basket from the mold 4, so that the basket will not stick or remain in the mold, but will be ejected therefrom, upon the withdrawal of the form from the mold. Another basket web may then be inserted for the production of another basket.

As shown in Fig. 13, the machine is equipped with a partial mold 60 rigidly secured to the shaft 7 previously described, and the basket form 61 is shaped to produce a round-bottom basket, so-called, as shown in the drawings, instead of the flat-bottom basket previously shown and described. The guard or shroud 62 can be substituted for the mold 14 previously described, on the same machine, and the form 60 is fastened in place by bolts 63, instead of the bolts 9 previously mentioned. In this way, a round-bottom basket, so called, is produced by the same swinging or oscillatory staplers, in combination with a continuous rotary feed for the basket or other receptacle on one and the same machine, simply by substituting interchangeable basket forming parts or members thereon.

As shown, the spindle 23 is rigid with the long square bar 64, extending longitudinally of the machine, adapted to slide endwise on the tops of the castings 2 and 3, whereby to reciprocate the form 5 toward and away from the stapling position. Any suitable means can be employed for reciprocating the bar 64, as, for example, the crank 65 mounted on the upper end of a vertically disposed rotary shaft 66, which latter may be operated by the worm gear 67 and the spur gearing 68 from the shaft 24 previously mentioned. The crank end of the arm 65 is swiveled in a block 69 which slides back and forth in the groove 70 formed in the bottom of the transverse bar 71 that is fastened in any suitable manner to the bar 64, whereby the block 69 reciprocates back and forth in the groove or channel 70 when the crank arm 65 is revolved, causing the desired reciprocation of the bar 64 in suitable timed relation to the other operating elements of the machine.

Power is communicated to the machine through a main pulley 72 on the shaft 24. It will be seen that power from this shaft, through the sprocket chain 45, is communicated through the sprocket wheel 73 to a sleeve 74 adapted to rotate in the bearing portion 29 previously mentioned, which sleeve 74 is rigid with the sprocket 75, whereby the second sprocket chain 46 is operated to rotate the shaft 41 in the manner previously explained.

A friction brake device 76 is provided on the shaft 7, of any suitable character, to stop the rotation at the required time, when the power is cut off, and the communication of power from the pulley 72 to the shaft 24 may be controlled in any suitable or desired manner, thereby to start and stop the operation of the machine.

From the foregoing it will be seen that the staplers move a distance with the basket materials, whenever staples are driven, whereby continuous rotary feed may be employed for the basket materials, without danger of distorting the staples, and without danger of defective driving of the staples, inasmuch as the staplers and the basket materials are moving in unison during the actual insertion of the staples.

From the foregoing, it will be seen that the basket supporting and feeding means have a rotary continuous feeding motion, whereby the feed is continuously rotary for each entire basket or receptacle, or other product. In combination with such continuous rotary feeding motion, there is provided a stapling mechanism that is operative to insert the staples without interrupting the said continuous rotary feeding motion, and preferably said mechanism for that purpose is movable back and forth about the axis of the work supporting and feeding means, whereby said stapling mechanism is movable back and forth on a circle which is concentric to the axis of the rotary basket support. For this purpose, the overhead axis of operation for the stapling mechanism is movable back and forth in a tilting plane, said plane tilting back and forth about the axis of the rotary basket support. In other words, the overhead axis of operation of the stapling mechanism moves from a vertical plane at one side of the axis of the rotary basket support, to another vertical plane at the other side of said basket-support axis, and then back again for each operation of the stapling mechanism. But, of course, during each actual staple-driving operation there is a time when the said overhead axis and the said basket-support axis are in a common vertical plane.

Thus, it will be seen that the horizontal axis of the rotary work holding and feeding means, such as the shaft 7, is rotated continuously, whereby the rotary work-feeding means is rotated continuously by power communicated through said axis thereto. In addition, it will be seen that power is communicated from this continuously driven axis to the shaft 41, whereby the continuously driven work-feeding axis serves to drive the overhead stapler-actuating axis continuously. In this way, there is a continuous and uninterrupted drive straight through from the shaft 24 to the shaft 7, and from the latter to the shaft 41, and the only interruption of this continuous rotation of the two axes, the shafts 7 and 41, is when each basket is finished and taken out of the machine. During such operation, and while fresh materials are being placed in position for the next basket, the rotary work-feeding means and the staplers are not in operation.

It will be seen, therefore, that each basket is given a complete uninterrupted circular feed, whereby each basket has a complete rotation, without any interruption whatever, before it leaves the machine. It is a complete circular feed, inasmuch as the materials that receive the staples revolve on the line of a true circle. In this way, the feed is completely circular, as well as being continuous and uninterrupted from start to finish.

What I claim as my invention is:

1. In machinery for stapling baskets or receptacles, the combination of receptacle forming means having a continuous rotary feed motion about a fixed axis, so that the feed is continuously rotary for each entire receptacle, stapling mechanism for inserting staples in the receptacle materials, without interrupting said rotary motion thereof, so that all of the staples are inserted while the materials are moving continuously about said axis, said mechanism having an overhead axis of operation, and instrumentalities actuated from one of said axes for causing said mechanism to move a distance with the materials, in unison therewith, during each successive staple insertion, adapted to cause said mechanism to move back in the opposite direction immediately after said staple insertion movement, and means to communicate power through said fixed axis to continuously rotate said forming means.

2. A structure as specified in claim 1, said instrumentalities comprising a movable frame on which said mechanism is carried.

3. A structure as specified in claim 1, said instrumentalities comprising a swinging or oscillatory frame on which said mechanism is mounted.

4. A structure as specified in claim 1, said instrumentalities comprising a support oscillatory about the axis of rotation of said receptacle forming means, upon which support said mechanism is mounted.

5. A structure as specified in claim 1, said instrumentalities comprising a support oscillatory about the axis of said receptacle forming means, upon which support said mechanism is mounted, and actuating means on said support to actuate said mechanism.

6. A structure as specified in claim 1, said instrumentalities comprising a support oscillatory about the axis of said receptacles forming means, upon which support said mechanism is mounted, and actuating means on said support to actuate said mechanism, said actuating means comprising an overhead shaft carried on the upper end of said support, with means on said shaft to cause said oscillatory motion of said support.

7. A structure as specified in claim 1, said instrumentalities comprising a support oscillatory about the axis of said receptacle forming means, upon which support said mechanism is mounted, and actuating means on said support to actuate said mechanism, said actuating means comprising an overhead shaft carried on the upper end of said support, with means on said shaft to cause said oscillatory motion of said support, together with devices to feed wire to the stapling mechanism, carried by said support, and means on said shaft to actuate said devices.

8. A structure as specified in claim 1, comprising power means for continuously rotating said receptacle forming means, including means operative in part about the axis of said receptacle forming means to operate said instrumentalities.

9. A structure as specified in claim 1, said instrumentalities comprising an overhead driving shaft provided with means for actuating said mechanism.

10. A structure as specified in claim 1, said receptacle forming means comprising a power operated receptacle engaging rotary member, and comprising another receptacle engaging member co-operating therewith and mounted to be rotated freely by the power communicated thereto from said receptacle.

11. A structure as specified in claim 1, said receptacle forming means comprising rotary means for engaging the exterior of the receptacle, adapted to be operated by power, comprising a receptacle form engaging the interior of the receptacle and adapted to be rotated thereby.

12. A structure as specified in claim 1, said receptacle forming means comprising a receptacle bottom engaging member having continuous rotary motion, and comprising a rotary receptacle form for pushing the receptacle bottom against said continuously rotating member.

13. A structure as specified in claim 1, said receptacle forming means comprising a continuously rotating member adapted to engage the bottom of the receptacle, externally thereof, said member having gear teeth, means engaging said gear teeth to rotate said member, thereby to rotate the receptacle, and comprising a receptacle form engaging the interior of the receptacle to push the receptacle bottom against said rotary member.

14. A structure as specified in claim 1, said receptacle forming means comprising a gear ring for engaging the outer sides of the receptacle, a receptacle form engaging the interior of the receptacle to support the receptacle sides against the inner periphery of said ring, and means for continuously rotating said ring, thereby to give the receptacle a continuous rotary feed during the entire period of stapling an entire receptacle.

15. A structure as specified in claim 1, comprising power means for continuously rotating said receptacle forming means, having power transmitting connections for also operating said instrumentalities.

16. A structure as specified in claim 1, said receptacle forming means being adjustable and interchangeable with other parts to make receptacles of different shapes.

17. In a machine for making baskets or receptacles, the combination of receptacle forming and supporting means having a continuous rotary feeding movement about the longitudinal axis of the machine, communicated thereto through said axis thereof, about which axis the receptacle is thereby given a complete uninterrupted circular feed, so that each receptacle has continuous motion about an axis fixed in relation to the entire receptacle, power means for causing said continuous rotary feeding movement, and stapling mechanism operative to insert staples in the receptacle materials during such continuous feeding movement thereof.

18. A structure as specified in claim 17, said mechanism having a shifting overhead axis of operation.

19. A structure as specified in claim 17, said mechanism having a shifting overhead axis of operation, said overhead axis being movable back and forth on the line of a circle concentric to the axis of said rotary feeding motion.

20. A structure as specified in claim 17, said power means comprising a shaft forming the axis of said rotary feeding means, to and through which power is communicated to continuously rotate said feeding means, and including means whereby the rotation of said shaft is continuous and uninterrupted for each entire receptacle.

21. A structure as specified in claim 17, said receptacle forming and supporting means comprising a rotary basket form mounted to move axially back and forth, and including a basket mold rotated continuously by communication of power from said power means to the axis thereof and adapted to receive said basket form, with the basket materials between them.

22. A structure as specified in claim 17, said receptacle forming and supporting means comprising a rotary basket form mounted to move axially back and forth, and including a basket mold rotated continuously by communication of power from said power means to the axis thereof and adapted to receive said basket form, with the basket materials between them, said basket form being rotated by power communicated thereto from said basket mold through the basket materials.

23. In machinery for stapling baskets or receptacles, the combination of receptacle forming means having a continuous rotary feed, stapling mechanism for inserting staples in the receptacle materials, without interrupting the rotary motion thereof, so that the staples are inserted while the materials are moving continuously, and instrumentalities for causing said mechanism to move a distance with the materials, in unison therewith, during each successive staple insertion, adapted to cause said mechanism to move back in the opposite direction immediately after said staple insertion movement, said instrumentalities comprising a support oscillatory about the axis of rotation of said receptacle forming means, upon which support said mechanism is mounted.

24. In machinery for stapling baskets or receptacles, the combination of receptacle forming means having a continuous rotary feed, stapling mechanism for inserting staples in the receptacle materials, without interrupting the rotary motion thereof, so that the staples are inserted while the materials are moving continuously, and instrumentalities for causing said mechanism to move a distance with the materials, in unison therewith, during each successive staple insertion, adapted to cause said mechanism to move back in the opposite direction immediately after said staple insertion movement, said instrumentalities comprising a support oscillatory about the axis of said receptacle forming means, upon which support said mechanism is mounted, and actuating means on said support to actuate said mechanism.

25. In machinery for stapling baskets or receptacles, the combination of receptacle forming means having a continuous rotary feed, stapling mechanism for inserting staples in the receptacle materials, without interrupting the rotary motion thereof, so that the staples are inserted while the materials are moving continuously, and instrumentalities for causing said mechanism to move a distance with the materials, in unison therewith, during each successive staple insertion, adapted to cause said mechanism to move back in the opposite direction immediately after said staple insertion movement, said instrumentalities comprising a support oscillatory about the axis of said receptacle forming means, upon which support said mechanism is mounted, and actuating means on said support to actuate said mechanism, said actuating means comprising an overhead shaft carried on the upper end of said support, with means on said shaft to cause said oscillatory motion of said support.

26. In machinery for stapling baskets or receptacles, the combination of receptacles forming means having a continuous rotary feed, stapling mechanism for inserting staples in the receptacle materials, without interrupting the rotary motion thereof, so that the staples are inserted while the materials are moving continuously, and instrumentalities for causing said mechanism to move a distance with the materials, in unison therewith, during each successive staple insertion, adapted to cause said mechanism to move back in the opposite direction immediately after said staple insertion movement, comprising power means for continuously rotating said receptacle forming means, including means operative in part about the axis of said receptacle forming means to operate said instrumentalities.

27. In machinery for stapling materials together, the combination of rotary work-feeding means having a horizontally disposed axis, forming the longitudinal axis of the machine, instrumentalities for communicating driving power through said axis to said work-feeding means thereby to continuously rotate the work-feeding means in a complete circle about a fixed axis, stapling mechanism mounted to move a distance with the work during the actual insertion of the staples therein, thereby to drive the staples in the moving work, means for causing said mechanism to move a distance with the work and then back to normal position, timed in operative relation to said continuous circular feed, and means for actuating said mechanism during the forward movement thereof in unison with the moving work.

28. A structure as specified in claim 27, said instrumentalities comprising a continuously driven power shaft having a sprocket-chain connection with said axis.

29. A structure as specified in claim 27, said actuating means comprising an overhead shaft rotated continuously by a driving connection extending thereto from said continuously rotating axis of the work-feeding means.

30. In machinery for stapling material together, the combination of rotary work-feeding means having a horizontally and longitudinally disposed driving axis, forming the longitudinal axis of the machine, means to communicate power to said axis to rotate the work-feeding means, stapling mechanism disposed in position to insert staples in the work, means including a longitudinal overhead shaft for actuating said mechanism, and a driving connection from said work-feeding axis to said shaft.

31. A structure as specified in claim 30, said work-feeding means comprising a shaping member having reciprocating movement in the direction of said work-feeding axis, thereby to receive and form the materials, and to withdraw from the finished products.

32. In a stapling machine for stapling materials together, the combination of work-supporting means, and driving means for continuously rotating said work-supporting means, whereby the materials have a complete uninterrupted circular feed, and means for inserting staples in the continuously moving materials.

33. A structure as specified in claim 32, said staple inserting means being mounted to move a distance with the work, during the actual insertion of staples therein, whereby said staple inserting means has a plurality of successive feeding movements in unison with the work for each complete uninterrupted circular feed of the material into which staples are inserted.

34. A structure as specified in claim 32, comprising cam means operative about a horizontal longitudinal axis for causing said staple inserting means to move back and forth over the work, whereby said staple inserting means moves a distance with the work each time during the actual insertion of staples therein, and whereby said staple inserting means has a plurality of forward feeding movements with the work for each complete uninterrupted circular feed of the materials into which staples are inserted.

35. A structure as specified in claim 32, comprising power-operated means whereby said staple inserting means is movable back and forth over the work, about an axis coincident with the axis of said circular feed of the materials, whereby the staple inserting means has a forward feeding motion with the work each time staples are inserted therein.

36. A structure as specified in claim 32, having means whereby said staple inserting means is operative to insert all staples radially of the axis of said circular feed, and whereby all staples are inserted while moving about said axis.

Specification signed this twenty-eighth day of January 1930.

WALTER F. NEWHOUSE.